(12) United States Patent
Thomas et al.

(10) Patent No.: US 7,707,069 B2
(45) Date of Patent: Apr. 27, 2010

(54) SUPPLY OF DIGITAL AUDIO AND VIDEO PRODUCTS

(75) Inventors: David R. Thomas, Opio (FR); Edwin Randolph Cole, Highland Park, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1345 days.

(21) Appl. No.: 11/158,812

(22) Filed: Jun. 21, 2005

(65) Prior Publication Data

US 2006/0288394 A1 Dec. 21, 2006

Related U.S. Application Data

(63) Continuation of application No. 09/545,667, filed on Apr. 7, 2000.

(30) Foreign Application Priority Data

Apr. 9, 1999 (EP) .................................. 99400886

(51) Int. Cl.
*G06Q 30/00* (2006.01)
(52) U.S. Cl. ................. 705/26; 705/27; 725/8
(58) Field of Classification Search ........................ None
See application file for complete search history.

(56) References Cited

U.S. PATENT DOCUMENTS

| 5,495,981 | A | 3/1996 | Warther |
| 5,963,916 | A * | 10/1999 | Kaplan ........................ 705/26 |
| 5,999,525 | A | 12/1999 | Krishnaswamy et al. |
| 6,005,621 | A | 12/1999 | Linzer et al. |
| 6,044,431 | A | 3/2000 | Greenwood et al. |
| 6,091,525 | A | 7/2000 | Cundiff |
| 6,157,377 | A | 12/2000 | Shah-Nazaroff et al. |
| 6,157,929 | A | 12/2000 | Zamiska et al. |
| 7,065,498 | B1 * | 6/2006 | Thomas et al. ................. 705/26 |
| 2003/0055786 | A1 * | 3/2003 | Smith et al. .................... 705/44 |
| 2008/0228507 | A1 * | 9/2008 | Larue et al. ..................... 705/1 |
| 2009/0228946 | A1 * | 9/2009 | Perlman et al. ............. 725/110 |

\* cited by examiner

*Primary Examiner*—F. Zeender
*Assistant Examiner*—Christopher Buchanan
(74) *Attorney, Agent, or Firm*—Robert D. Marshall, Jr.; W. James Brady; Frederick J. Telecky, Jr.

(57) ABSTRACT

A server for a merchant computer system, the server comprising: a file store for storing a range of audio/video products in respective product files; a dialogue unit having a network connection and operable to invite and receive a client selection from among the products via the network connection; a product reader for reading the product files to generate a digital audio/video signal; a digital signal processing unit having an input connectable to receive the digital audio/video signal from the product reader, a processing core operable to apply a defined level of content degradation to the digital audio/video signal, and an output connected to output the degraded digital audio/video signal from the processing core to the network connection. It is therefore possible for a content provider to change the characteristics of an audio or video data stream supplied over a network to a potential purchaser in a controlled and variable manner. The amount of degradation is sufficient to enable a potential purchaser to appreciate the characteristics of the audio or video product, whilst reducing the perceived quality.

62 Claims, 8 Drawing Sheets

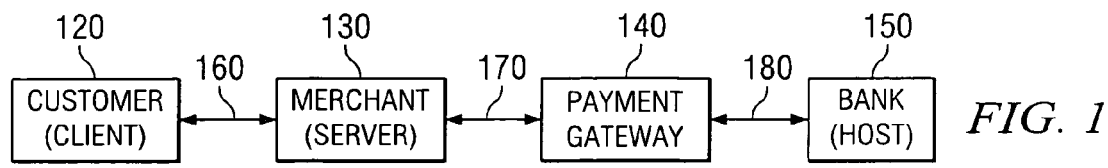
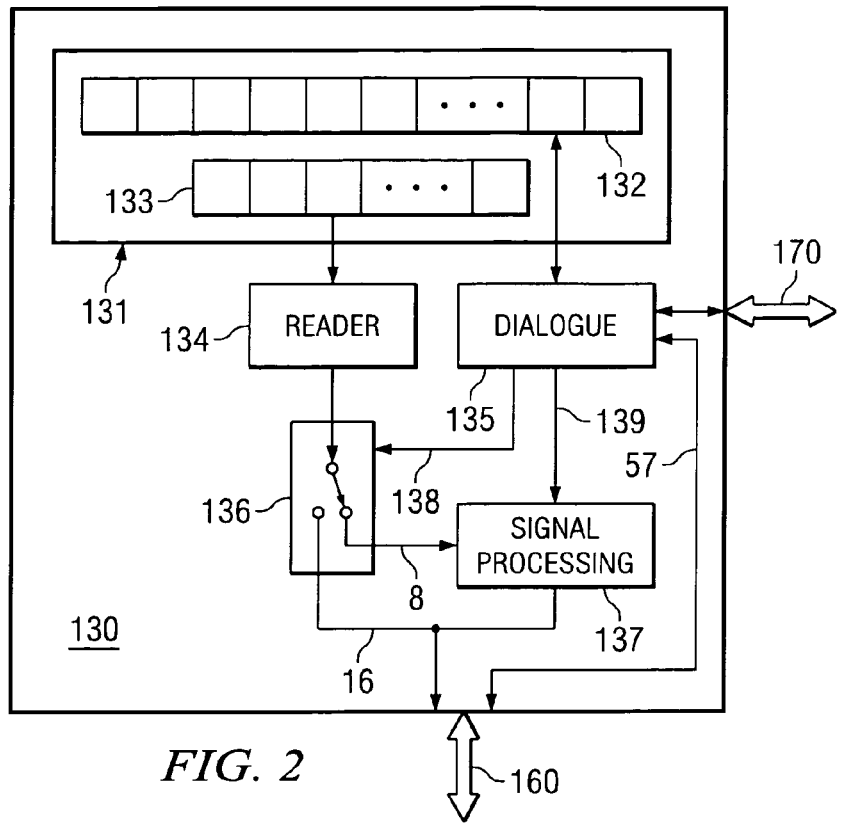
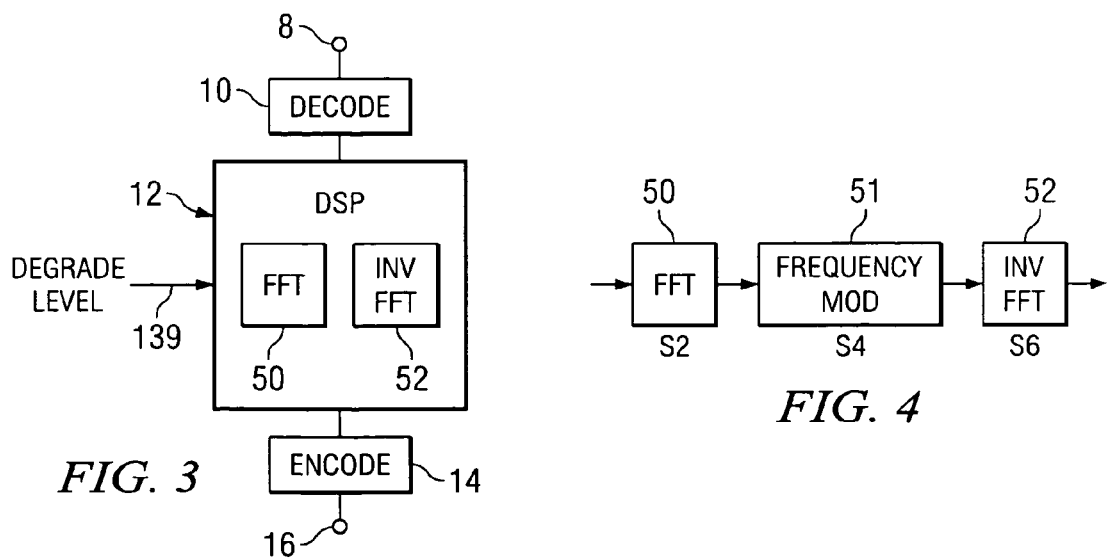

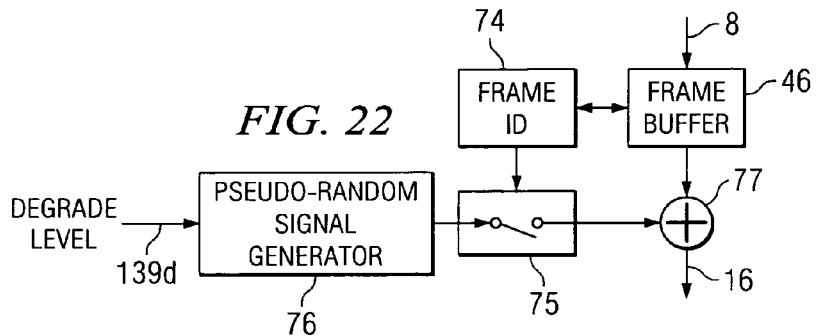
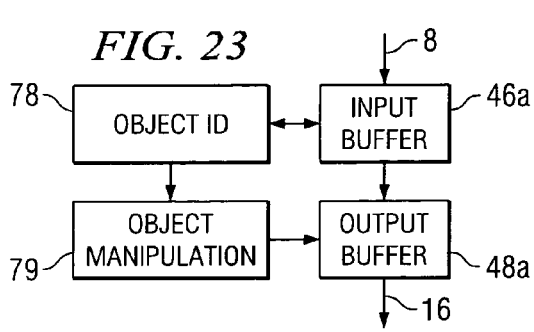
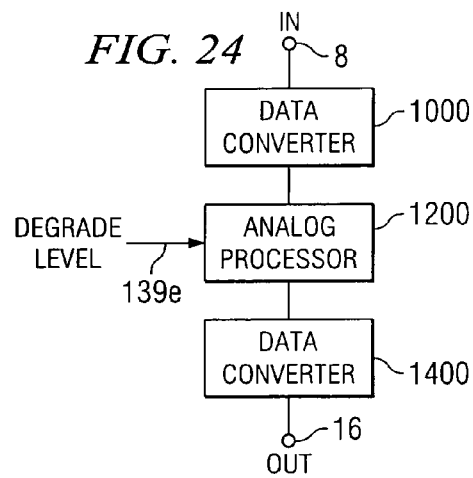
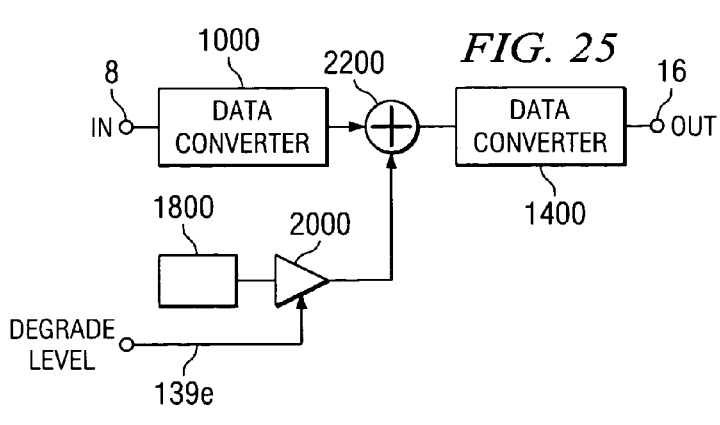
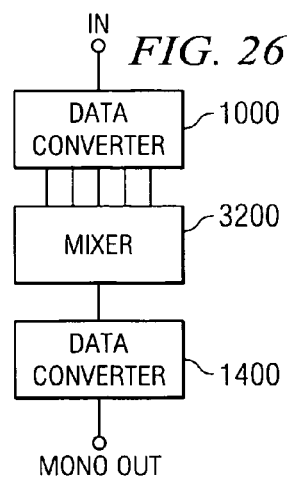

SUPPLY OF DIGITAL AUDIO AND VIDEO PRODUCTS

This application is a continuation of U.S. patent application Ser. No. 09/545,667 filed Apr. 7, 2000.

BACKGROUND OF THE INVENTION

The invention relates to the provision of digital audio or video products, for example over a network or in a pre-purchase listening or viewing kiosk. More especially, but not exclusively, the invention relates to the sale of such products over a public network, such as the Internet or other similar public communication systems.

A variety of techniques collectively known as digital watermarking has been developed to address the issue of unauthorized or illegal copying of digital video and audio products. Some such techniques result in a copied product being unviewable or inaudible. Other techniques block the copying of a watermarked original by open-circuiting the input stage of a video recorder (VCR) or other recording device when the correct watermark is not detected. Other techniques encode the source purchaser, or other information, to enable identification and tracking of unauthorized copies.

Many digital watermarking techniques are specifically directed to copying from a physical recording medium, such as a compact disc (CD) or a digital video disc (DVD). However, the transfer of digital data streams between nodes of a network raises different issues as will now be described by way of an example.

Conventionally, in a record store, it is possible for a customer to listen to an audio product prior to purchase for pre-purchase evaluation. This has proven to be an effective method for promoting sales and ensuring customer satisfaction with purchased products. However, in the context of Internet sales of audio or video products, a customer is typically shopping at home or in another comfortable environment with an audio or video reproduction system or in an Internet supported kiosk. In such an environment, unrestricted pre-purchase listening or viewing may compromise the purchase itself.

A customer who abuses the system in this way would however not be making a copy of the audio or video product. In effect, the seller would be copying the product by transmitting it to the potential buyer over the network. Conventional digital watermarking techniques would be ineffective, since there is no copying taking place.

It is thus an aim of the invention to provide means by which a potential purchaser of a video or audio product can sample the product without compromising the purchase.

SUMMARY OF THE INVENTION

Particular and preferred aspects of the invention are set out in the accompanying independent and dependent claims. Features of the dependent claims may be combined with those of the independent claims as appropriate and in combinations other than those explicitly set out in the claims.

According to a first aspect of the invention, a server for a merchant computer system is provided that has a file store configured to store a range of audio/video products in respective product files, a dialogue unit operable to invite and receive a client selection from among the products, a product reader connected to read the product files from the file store to generate a digital audio/video signal, and a signal processing unit. The signal processing unit has an input selectively connectable to receive the digital audio/video signal from the product reader, a processing core operable to apply a defined level of content degradation to the digital audio/video signal, and an output connected to output the degraded digital audio/video signal. The term "audio/video" is used to mean audio, video or both.

It is therefore possible for a content provider to change the characteristics of an audio or video data stream supplied over a network or other public communications system to a potential purchaser by degrading it in a controlled and variable manner. The amount of degradation is preferably sufficient to enable a potential purchaser to appreciate the characteristics of the audio or video product, whilst reducing the perceived quality. In addition, the changes to the characteristics of the audio or video data stream are preferably such that the original high-fidelity product cannot be reconstructed from the low-fidelity pre-purchase sample.

Further aspects of the invention are exemplified by the attached claims.

At this point it is noted that in this document references to purchase, buying, sale and the like are used to include other forms of transaction, such as loan, lease or license.

BRIEF DESCRIPTION OF THE DRAWINGS

For a better understanding of the invention and to show how the same may be carried into effect reference is now made by way of example to the accompanying drawings in which:

FIG. 1 is a block schematic diagram of a computer network according to an embodiment of the invention;

FIG. 2 shows an embodiment of the server of the network of FIG. 1 in more detail;

FIG. 3 shows internal structure of a digital signal processor for processing a digital video/audio signal according to one example;

FIG. 4 shows process flow for processing a digital video/audio signal using the digital signal processor of FIG. 3 to manipulate the signal data in the frequency domain;

FIG. 22 shows internal structure of the processing unit according to a further example for processing MPEG video data;

FIG. 23 shows internal structure of the processing unit according to a further example for processing MPEG4 video data;

FIG. 24 shows internal structure of a processing unit using analog processing techniques according to a first analog example;

FIG. 25 shows internal structure of a processing unit using analog processing techniques according to a second analog example;

FIG. 26 shows internal structure of a processing unit using analog processing techniques according to a third analog example;

DETAILED DESCRIPTION

Figure 5A:
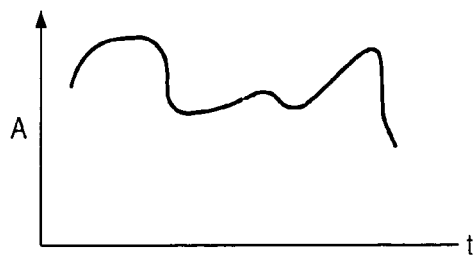
FIGS. 5A to 5F are schematic representations of data in the time and frequency domains showing operation of a band-reject filtering process.

FIG. 1 is a block schematic diagram of a computer network according to an embodiment of the invention. The network comprises a customer computer system 120, acting as a client, which has a communication link 160 to a merchant computer system 130, acting as a server. The customer-merchant communication operates under a general purpose secure communication protocol, such as the SSL protocol (Secure Sockets Layer which is a product of Netscape, Inc.). The merchant computer system 130 has a communication link 170 to a payment gateway computer system 140. The payment gateway provides electronic commerce services to the merchant computer system 130 from a bank computer system 150, acting as a host. The gateway 140 and bank computer system 150 are interconnected by a communication link 180 used for supporting customer authorization and the capture of transactions. The various communication links described above and later herein may include links that have wireless portions, or may be a wireless link.

The merchant to payment gateway communication link 170 operates under a secure payment protocol referred to as merchant-originated secure electronic transactions (MO-SET) which is a kind of secure electronic transactions (SET) protocol developed by Visa and MasterCard. Other suitable secure payment protocols include: secure transaction technology (STT); secure electronic payments protocol (SEPP); Internet keyed payments (iKP); net trust; and cybercash credit payment protocol, to name but some. Generally, these secure payment protocols require the customer to operate software that is compliant with the secure payment technology. The protocol is used for interacting with the third-party certification authorities, allowing the customer to transmit encoded information to a merchant, some of which may be decoded by the merchant 130 and some of which can be decoded only by the payment gateway 140. Alternatively, the purchase could be enacted using a pre-authorized money card.

FIG. 2 is a block schematic diagram of elements of the internal structure of the server merchant computer system 130. A dialogue unit 135 is provided for interfacing with the client 120 and payment gateway 140 through the communication links 160 and 170 respectively. The dialogue unit 135 is responsible for establishing and performing client-server and gateway-server communication. The server further comprises a file store 131 containing a range of audio/video products stored digitally in product files 133. A product reader 134 is also provided and is operable to read a selected one the product files and to output a digital data stream in a standard audio or video format, for example 16-bit CD audio or MPEG video.

A data path links the output of the reader 134 to one side of a degrade switch 136 which is connected in the illustrated position to route the reader output to an input 8 of a signal processing unit 137 having a processing core operable to apply a defined level of content degradation to the digital audio/video signal. An output 16 of the signal processing unit 137 leads to an output of the server for connection to the client-server communication link 160. In another switch position (not illustrated) the degrade switch 136 routes the reader output directly for output to the client-server communication link 160. The position of the degrade switch 136 thus defines whether or not a signal output from the server for the client is routed through the signal processing unit 137. The position of the degrade switch is controlled by a control signal that is input from the dialogue unit 135 through a control line 138.

The purpose of the signal processing unit 137 is to degrade the quality of an audio or video signal by a defined amount. In the present embodiment, the defined amount is variable, being set by a degrade level signal received from the dialogue unit 135 through a control line 139 to the signal processing unit 137. The dialogue unit 135 thus has a control function determining whether or not a signal is degraded when output, and by what amount.

The amount of degradation applied is determined by a degrade level signal supplied over line 139 which is a scalar or quasi-scalar variable which can adopt values between a minimum or maximum. The minimum value can be set to provide no appreciable degradation, or a minimum non-zero level of degradation. The maximum value can be set to apply the maximum amount of degradation, for example for a known bad client, which renders the audio or video quality unacceptably low, even for evaluation purposes. The degrade level is computed having regard to a client integrity indicator determined from a personal client file. A portion of the file store 131 is reserved for storing individual client files 132. The client files 132 include client history data, including past purchasing records. The degrade level may also be computed having regard to an authorization response received from the payment gateway 140 following an authorization request including a client i.d., a client payment instrument and a monetary value of the product selected for evaluation. The authorization response may include a credit rating factor as well as a simple YES/NO to the proposed transaction. It will also be appreciated that the degrade level computation may take account of both the client file content and the authorization response.

An example of the operation of the e-commerce system of FIGS. 1 and 2 is now described.

First, the client 120 establishes communication with the server 130 to identify the customer. To do this, the customer computer system 120 initiates communication with the merchant computer system 130 through communication link 160 using any access protocol, for example transmission control protocol/internet protocol (TCP/IP). The customer computer system 120 acts as a client and the merchant computer system 130 acts as a server. After exchanging hello messages, the client and server exchange authentication certificates and establish encryption protocols to be used for further communication, whereafter client-server communication is performed using the agreed form of the secure communication protocol. At this point, the dialogue unit 135 searches the file store for a customer file 132 and creates a new customer file if none exists.

The client transmits to the server information on the payment instrument to be used for payment for any products to be purchased. For example, a credit card number and user code number may constitute the payment instrument information. In order to obtain payment, the server must supply this information to the payment gateway responsible for the payment instrument tendered by the client. This enables the server to perform payment authorization and payment capture. Payment authorization is the process by which permission is granted by a payment gateway operating on behalf of a financial institution to authorize payment on behalf of the financial institution. This is a process that assesses transaction risk, confirms that a given transaction would not reduce the account balance below a threshold and reserves the specified amount of funds. Payment capture is the process that triggers the movement of funds from the financial institution to the merchant's account.

Under control of the dialogue unit 135, the server then transmits to the client information on a range of video and/or audio products available for purchase, for example by reading header segments of a group of the product files 133.

The client then transmits to the server an evaluation request for one of the products. The evaluation request is routed to the dialogue unit 135.

The server then transmits a payment authorization request to the gateway specifying the requested product and the payment instrument data. The authorization request data includes all the information for determining whether a request should be granted or denied. Specifically, it includes information on the party to be charged, the amount to be charged, the account number to be charged, and any additional data, such as passwords, needed to validate the charge. This information is computed from the customer product selection.

An authorization transaction is used to validate the payment instrument tendered by the customer for a prospective sale. Various payment instruments may be supported, selectable by the customer. Support can be included for credit cards, debit cards, electronic cash, electronic checks and smart cards, for example.

For high value items, for example, the system may be configured so that the payment instrument's 'open-to-buy' amount is reduced by the authorized amount. This form of authorization, which may be referred to as pre-authorization, is thus analogous to a check-in transaction in a hotel where the minimum amount required for a customer's planned stay in the hotel is reserved. The transaction does not confirm a sale's completion to the host and there is no host data capture in this event. The server captures this transaction record and later forwards it to the host to confirm the sale in a forced post transaction request that confirms to a host that a completion of a sale has been accomplished and requests data capture of the transaction.

A payment authorization response is then transmitted from the gateway to the server. If the authorization response is negative, then the dialogue unit 135 is configured to inform the client accordingly and request that another payment instrument be tendered. If a further payment instrument is not tendered the session can either be terminated, or the product selection can be restricted to lower cost products that would not exceed the payment instrument's open-to-buy amount. On the other hand, if the payment authorization responsive is positive, the session proceeds as follows.

The dialogue unit 135 computes a degrade level having regard to data held in the personal client file 132, the data contained within the authorization response received from the payment gateway 140, or both. A customer with an established track record of making purchases following evaluation sessions, and who tenders a payment instrument with a good credit rating, will score highly, so that the degrade level would be set low. On the other hand, a customer with an established track record of evaluation without purchase would receive a high degrade level. An unknown customer would receive an intermediate degrade level, optionally with a weighting for credit rating taken from the authorization response.

On the basis of the computed degrade level, the dialogue unit 135 of the server 130 will then output the switch control signal 138 to route the reader output through the signal processing unit 137. Moreover, the dialogue unit 135 will output the degrade level signal to the signal processing unit 137 to define the amount of degradation to be applied to the product file data stream, which is then output to the client as a degraded evaluation version of the selected product.

The pre-purchase evaluation phase is then concluded by the customer deciding whether or not to purchase the evaluated product. This is effected by a payment decision being transmitted from the client 120 to the server 130.

If the customer payment decision is negative, then the dialogue unit 135 re-offers the product file range for a new selection.

If the customer payment decision is positive the server transmits to the gateway a payment capture request for the previously authorized payment. Once payment capture processing is complete, this is communicated to the server from the gateway by way of a payment capture response.

In the unlikely event that the payment capture response is negative, then the sale is aborted. On the other hand, if the payment capture response is positive, then the dialogue unit 135 outputs the switch control signal 138 to route the reader output directly to the client, i.e. without passing through the signal processing unit 137.

To complete the sale, the server then transmits to the client a non-degraded or high-fidelity version of the selected product. The high-fidelity version is preferably digitally watermarked to provide conventional copy protection and/or source tracking post purchase.

Further details of suitable architecture for the client, server and gateway, and of the communication and payment protocols, can be found in WO 97/49055, the contents of which is incorporated herein by reference. For kiosk type transactions the product may be downloaded without degradation, but instead will include software providing a limited number of plays or a short time frame for playing.

Similarly, the specific sequence of transactions may be varied from the foregoing description. For example, information about the payment instrument may be provided to the server after a product has been selected for purchase. As another example, for prior customers, the amount of degradation is based upon historical data about a customer stored either on the server or at some other location.

A number of processes for degrading the digital audio or video signal in a controlled manner are now described by way of example.

In the following it will be understood that a video product often includes audio content and that examples referring to degradation of an audio data stream may be applied to degrade the audio content of a video product. Moreover, the degradation of an audio component of a video product, in certain situations, may serve as the sole means of degradation of the video product.

FIG. 3 shows internal structure of the signal processing unit 137 which, in the following example, is based on a digital signal processor (DSP) 12 including a fast Fourier transform (FFT) unit 50 for performing discrete Fourier transforms (DFT's) from the time domain to the frequency domain, and an inverse FFT unit 52 for performing inverse DFT's from the frequency domain to the time domain. The DFT and inverse DFT algorithms may be embedded in hardware or may be defined in software and implemented in hardware in a general computational unit of the DSP 12, or may be combinations of both.

The signal processing unit 137 receives the digital data stream at the input 8 and supplies the digital data stream to a decoder 10 for decompressing the digital data stream from a known standard, such as MPEG2 or MPEG4 for video or audio signals, or 16-bit CD for audio. The decompressed digital data stream is then processed by the DSP 12 to achieve degradation of the perceived video or audio quality. The degraded signal is then supplied to an encoder 14 and re-compressed to the format of the original coding standard received at the input 8. Although depicted in FIG. 3 as separate blocks, decoder 10 and/or encoder 14 may be implemented as software running on the DSP 12. For certain digital data, decoder 10 and encoder 14 may not be required.

For audio signals, the DSP 12 may act as a frequency domain modulator. The decoded digital data stream is subjected to a DFT in the FFT unit 50 in order to transform the data into the frequency domain where a signal-degrading modulation is applied by manipulation of the frequency coefficients. The modulated frequency domain spectrum is then transformed back into the time domain through the application of an inverse DFT by the inverse FFT unit 52.

FIG. 4 shows the process flow generic to frequency domain modulation techniques in which the signal is transformed into the frequency domain in Step S2 by the FFT unit 50, manipulated in the frequency domain in Step S4 by a frequency domain modulation unit 51, and then transformed back into the time domain in Step S6 by the inverse FFT unit 52.

FIGS. 5A to 5F show a form of frequency domain modulation that may be used, namely band-reject filtering, sometimes referred to a notch filtering.

FIG. 5A is a continuous representation of an amplitude modulated signal in the time domain A(t) as conveyed by the digital audio signal. Owing to its finite nature, the digital audio signal will of course only convey a sampled representation of A(t) in reality.

Figure 5B:
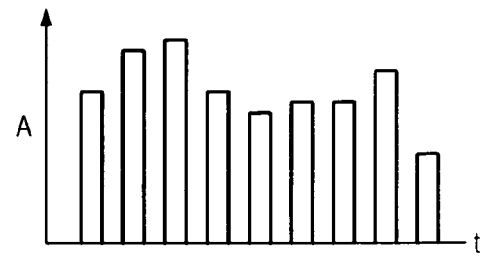

FIG. 5B shows the digitized or discretized version of the same function namely $\{A_n(t)\}$.

Figure 5C:
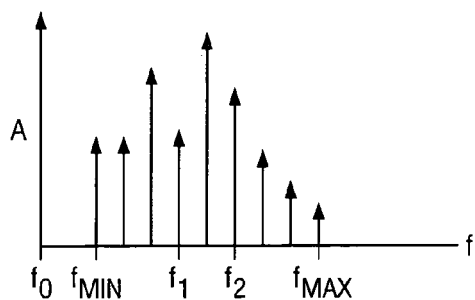

FIG. 5C shows the same discrete function now in the frequency domain $\{A_n(f)\}$ after application of the DFT in Step S2. Frequency components in the range $f_{min}$ to $f_{max}$ are shown, these frequencies representing the lower and upper bounds respectively of the audio frequency range to be transmitted. This range will usually be the full humanly audible frequency spectrum or a sub-set thereof.

Figure 5D:
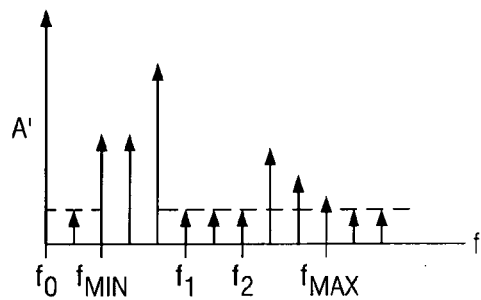

FIG. 5D shows the manipulated function $\{A'_n(f)\}$ after application of band-rejection in the frequency range $f_1$ to $f_2$. The band rejection is achieved by setting the frequency coefficients $A_n$ to zero or near zero values for all frequencies between $f_1$ and $f_2$.

Figure 5E:
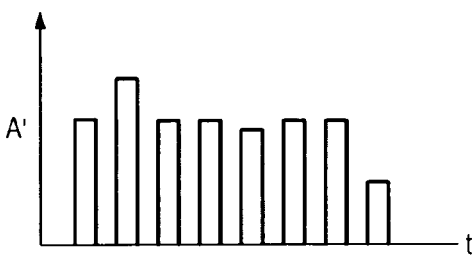

FIG. 5E shows the discrete form of the manipulated function as transformed back into the time domain namely $\{A'_n(t)\}$ as supplied to the encoder 14.

Figure 5F:

FIG. 5F is a continuous representation of the manipulated function A'(t).

The center frequency and passband width of the band-reject filter can be selected based on a pseudo-random number sequence with a very long period. The audio stream can then be processed with the notch filter to change its spectral characteristics. In addition, the center frequency and pass-band width can be changed periodically. The pseudo-random number sequence can be varied, for example according to the time of day.

Another form of frequency domain modulation that may be used is low-pass filtering to remove, or attenuate, spectral components above a selected frequency. If the high-frequency components are attenuated, rather than being removed, high-frequency noise is preferably added to prevent restoration of the high quality original signal by a filter which compensates for the attenuation. Instead of, or as well as, low-pass filtering, the DSP 12 may be configured to perform high-pass filtering, or attenuation below a selected frequency. Similar design considerations apply as for low-pass filtering. In each case the process flow follows that shown in FIG. 4. Moreover, referring to FIGS. 5A to 5F, these other kinds of frequency modulation can be understood as differing from the band-reject filter example only in that the modulation technique applied is different from that shown in FIG. 5D.

Figure 6A:
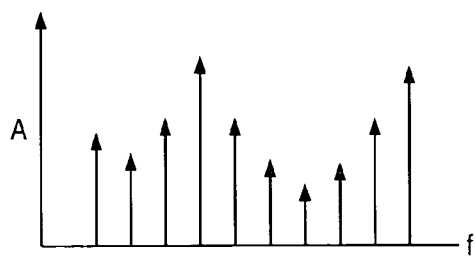
FIGS. 6A and 6B are schematic representations of data in the frequency domain showing operation of a phase inversion process.
Figure 6B:
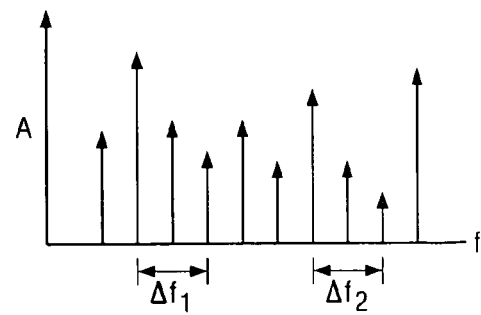

FIGS. 6A and 6B shows a further example of frequency-domain degradation applicable with a DSP. This example relies on modulation in the frequency domain using apparatus as described above with reference to FIG. 3 and FIG. 4. In this example, the frequency domain signal $A_n(f)$ is subdivided into a plurality of frequency ranges $\Delta f_k$ to which frequency or phase inversion is selectively applied dependent on the degrade level signal which thus serves as a control signal for activating selected ones of the inversion ranges so as to apply phase inversion to none, one or more of the frequency bands.

FIG. 6A shows the digitized frequency domain signal $A_n(f)$ and is thus comparable with FIG. 5C in the band-rejection filter example.

FIG. 6B shows the modulated signal after frequency inversion within two frequency bands $\Delta f_1$ and $\Delta f_2$.

Otherwise, the FFT and inverse FFT process steps are as described with reference to FIGS. 5A to 5F.

The frequency bands selected for inversion may be varied with time, for example in a random or pseudo-random fashion, or by sequential polling, thereby to provide a further subjective impression of quality degradation in the output signal and to provide a further barrier to distortion removal by a hacker. In its simplest form, there may be provided only a single phase inversion band.

In the above frequency domain modulation examples, the degrade level can be used in determining the range of modulated, removed or attenuated frequencies according to the subjective significance of the frequencies of concern to a listener.

Figure 7A:
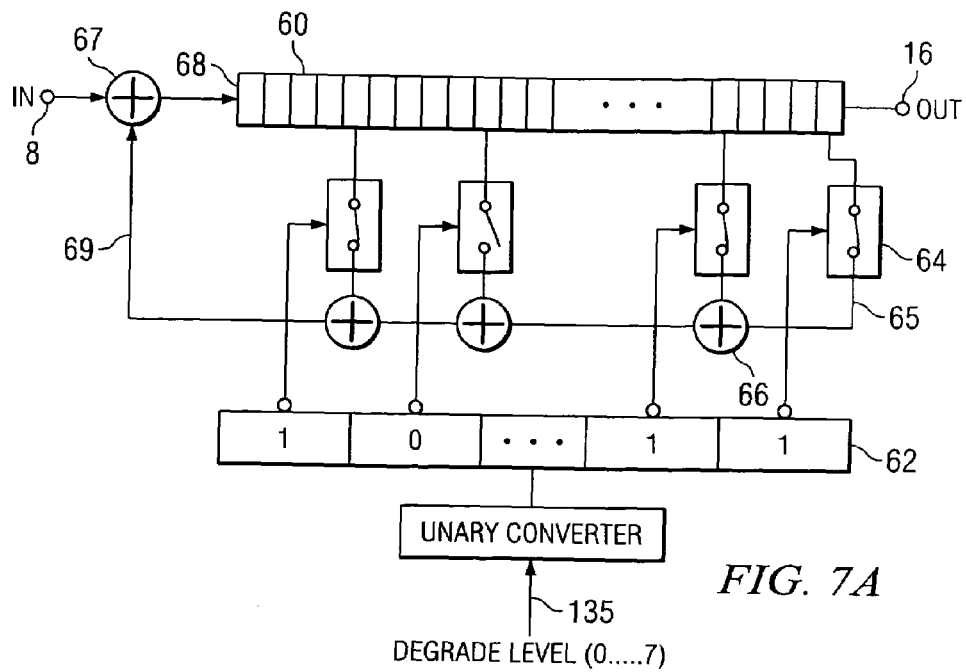
FIG. 7A shows a delay line structure for degrading a bit stream conveying video or audio data according to another example.

FIG. 7A shows internal structure of another example for producing signal degradation which may be implemented in hardware or software using a DSP 12. The digital data stream is received through the input 8, fed through a delay line structure and output through the output 16. The delay line structure includes a shift register 60 with a bank of taps 65 which can be selectively turned on and off by respective switches 64 responsive to the degrade signal 139. The taps 65 are tied together with a feedback line to the input end of the shift register 60 with respective adders 66, there being a further adder 67 arranged to combine the input digital data stream from input 8 with the feedback signal stream from the taps 65. The feed back structure of the taps and adders thus form circuitry that acts to inject noise into the digital data stream by manipulation at the bit level. The degrade level signal 139 is received at a further input in the form of a 3-bit binary signal having one of eight values in a range 0 to 7. The degrade level signal is supplied to a unary converter which generates an 8-digit unary representation of the 3-bit binary degrade level, each bit of the unary representation controlling one of the tap switches 65. With this arrangement, the higher the degrade level, the more taps are closed, so the greater the amount of signal degrading feedback is provided. In operation, if a tapped binary value is zero then this will feed back to the shift register input as a zero and not have any effect. On the other hand, if the tapped binary value is one, then this will be fed back as a one and will set the digital data stream bit at the output of the adder 67.

Figure 7B:
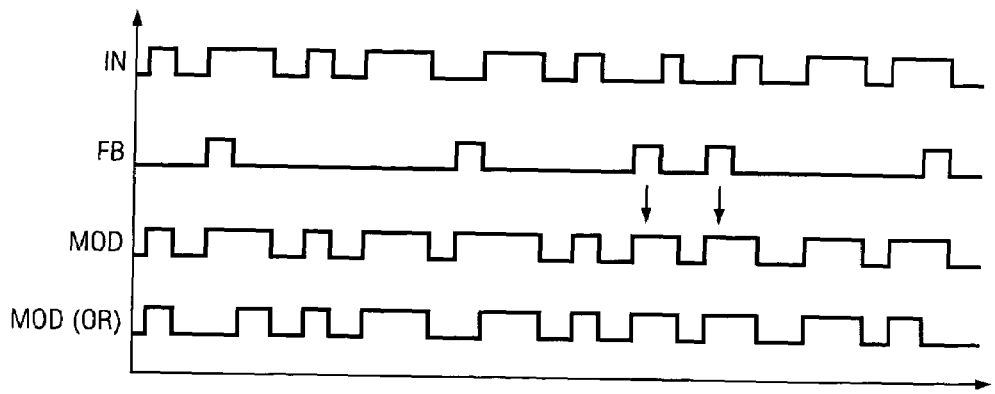
FIG. 7B shows bit streams relating to the delay line structure of FIG. 7A.

FIG. 7B is a graph showing schematically a number of bit stream traces. The uppermost trace, labeled IN, shows the digital data stream received at the input 8. The next trace, labeled FB, shows the feedback signal 69 as supplied to the adder 67 when a certain number of the switches 65 are closed, thus opening their corresponding taps 65. The next trace, labeled MOD, shows the signal 68 output from the adder 67, i.e. the additive combination of the two signals shown in the upper traces IN and FB. In the arrangement illustrated in FIG. 7A, only the two bits shown with vertical arrows in FIG. 7B are changed, since the other bits set as a result of the feedback were already set in the incoming data stream.

In an alternative arrangement, the adder 67 shown in FIG. 7A could be substituted with an exclusive OR combiner so that a one appearing on the input of the exclusive OR from the feedback line would have the effect of toggling the bit on the data stream received from input 8. The resultant bit stream with input signals IN and FB is shown with the lower trace of FIG. 7B, labeled MOD(OR).

Figure 8:
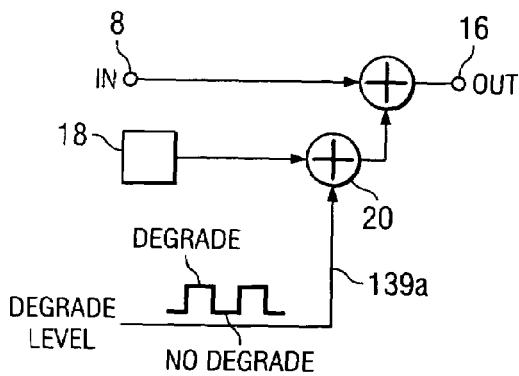
FIG. 8 shows internal structure of a digital signal processor for processing a digital audio signal according to a further example in which a secondary signal is added.

FIG. 8 shows another example of DSP implementable manipulation of a digital audio signal for degrading perceived signal quality. Again, this example may be implemented in hardware or software using a DSP 12. In this example, a data generator 18 is provided, the output of which is supplied to adder 20. The value to be added by the adder 20 is controlled by the degrade level conveyed by the digital degrade level signal 139a. The output of the adder 20 is received at one input of an adder 22, the other input of which receives the high-fidelity digital data stream received at the input 8 from the reader 134. The adder 22 thus serves to add to the high-fidelity digital signal a secondary digital signal generated by the data generator 18, the secondary digital signal having a number of bits defined by the degrade level. Finally, the output of the adder 22 is supplied to the output 16 for the client 120.

The data generator 18 may be a source of pseudo-random data. For example, the signal generator 18 may be a pseudo-random data generator with a very long period used to generate low-level audible noise with desired spectral and/or temporal characteristics. Especially for classical audio recordings, the data generator may generate the data to emulate the form of one or more of the rumble, hiss and popping of an old, possibly scratched, vinyl or acetate recording.

As an alternative to noise-type effects, the data generator 18 may be a source of a secondary content-based audio signal, for example a speech bearing signal. In the case of a music product, the speech signal generated by the signal generator 18 can thus be added to cause a voice-over of the music, thereby spoiling the appreciation of the music. This could be achieved with a D.J. voice-over for popular beat music or a monotonic nasal announcer for classical music. The music can thus be rendered unusable for high quality listening, while still allowing the listener to verify that the correct audio stream has been selected, and that the music is worthy of purchase.

Figure 9:
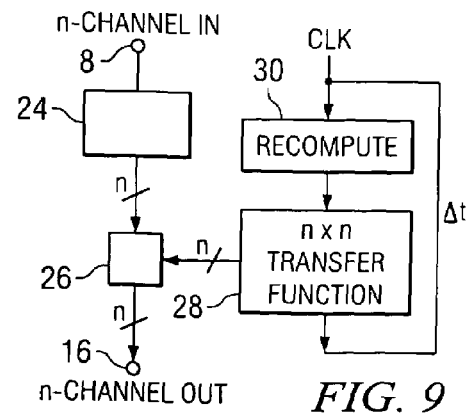
FIG. 9 shows internal structure of a digital signal processor for processing a multi-channel digital audio signal according to a further example.

FIG. 9 shows a further example configuration of the processing unit 137 suitable for implementation in hardware or software using a DSP 12. This example is applicable to audio signals. An audio signal comprising a plurality 'n' of channels is received at the input 8. The audio signal is preprocessed into a vector form by a pre-processing unit 24 and then supplied to a n-channel filter unit 26 for processing prior to output to the n-channel output 16. The processing unit 137 further comprises a matrix unit 28 in which is stored a matrix defining the mapping between the input channels and the output channels, that is between the channels output from the reader 134, and the channels to be output to the client 120. In the case of 5.1 channels, such a matrix would be as follows, in the case that no degradation was to be applied:

| Input Channel | Output Channel | | | | | |
|---|---|---|---|---|---|---|
| | L | C | R | Ls | Rs | LFE |
| L | 1.0 | 0 | 0 | 0 | 0 | 0 |
| C | 0 | 1.0 | 0 | 0 | 0 | 0 |
| R | 0 | 0 | 1.0 | 0 | 0 | 0 |
| Ls | 0 | 0 | 0 | 1.0 | 0 | 0 |
| Rs | 0 | 0 | 0 | 0 | 1.0 | 0 |
| LFE | 0 | 0 | 0 | 0 | 0 | 1.0 |

L, C and R signify left, center and right channels, respectively. Ls and Rs signify left and right surround channels, respectively. LFE signifies low frequency effects.

As will be appreciated, the above matrix is the n×n identity matrix. If no attenuation or amplification is intended, the numerical sum of the magnitudes of the elements in the matrix should always equal the number of channels, in this case six.

To generate degradation, a non-identity matrix is used. For example, the following matrix can be used to switch the left (L) and right (R) channels:

| Input Channel | Output Channel | | | | | |
|---|---|---|---|---|---|---|
| | L | C | R | Ls | Rs | LFE |
| L | 0 | 0 | 1.0 | 0 | 0 | 0 |
| C | 0 | 1.0 | 0 | 0 | 0 | 0 |
| R | 1.0 | 0 | 0 | 0 | 0 | 0 |

-continued

| Input Channel | Output Channel | | | | | |
|---|---|---|---|---|---|---|
| | L | C | R | Ls | Rs | LFE |
| Ls | 0 | 0 | 0 | 1.0 | 0 | 0 |
| Rs | 0 | 0 | 0 | 0 | 1.0 | 0 |
| LFE | 0 | 0 | 0 | 0 | 0 | 1.0 |

Spatial modification of the signal for signal degradation can thus be performed by performing a matrix multiplication in the n-channel filter unit 26, the operands being the transfer function matrix stored in the matrix unit 28 and the 1×n matrix, i.e. vector, presented by the pre-processing unit 24. As illustrated schematically, the n×n matrix can be modified periodically at intervals of time Δt so that the spatial modification of the audio signal continually changes. Each clock trigger CLK occurring at the time intervals Δt induces a recomputation of the transfer function matrix by a computation unit 30 provided for this purpose. It will be understood that the time interval Δt may be allowed to vary in a random or pseudo-random fashion and need not represent a fixed time interval. In this example, the degrade level signal 139*a* may or may not be utilized. If utilized, the degrade level signal is supplied to the computation unit 30 and used to control the selection of the transfer matrices.

In a modification of this example, the n-channel filter unit 26 may incorporate head related transfer functions (HRTF's). These are functions that can be used to position audio sources at a selected azimuth and elevation around the listener. The individual channels of a multichannel audio stream can be perceptually moved around by appropriate filtering with HRTF's. The HRTF's are computed in the computation unit 30 and stored in the n-channel filter unit 26. The HRTF's are changed periodically at intervals of time Δt as described above. Individual channels will then be perceived as moving around by the listener, thereby degrading the quality of the sound.

In a further alternative to the channel switching example, random or periodic phase inversion of the channels can be created to simulate unmatched speakers. Using the above switching matrix, a negative value will represent a phase inversion for a given output channel. For example, inverting the phase of the left (L) and left surround (Ls) channels is achieved with the following transfer matrix:

| Input Channel | Output Channel | | | | | |
|---|---|---|---|---|---|---|
| | L | C | R | Ls | Rs | LFE |
| L | −1.0 | 0 | 0 | 0 | 0 | 0 |
| C | 0 | 1.0 | 0 | 0 | 0 | 0 |
| R | 0 | 0 | 1.0 | 0 | 0 | 0 |
| Ls | 0 | 0 | 0 | −1.0 | 0 | 0 |
| Rs | 0 | 0 | 0 | 0 | 1.0 | 0 |
| LFE | 0 | 0 | 0 | 0 | 0 | 1.0 |

It will thus be understood that the channel switching procedure can be used to induce phase distortions as well as spatial modifications in an audio signal.

The apparatus of FIG. 9 may also be used for channel removal or attenuation. This can be effected by setting the appropriate matrix elements to zero, or by dividing the appropriate matrix elements by an attenuation factor. In this way, x channels of an n channel signal can be removed or attenuated.

For a multi-track audio recording where different instrument and vocal tracks are available on separate channels, channel removal may serve to remove one or more instruments from the multi-track recording. This technique requires one channel per track and will thus be possible for database master recordings, but not for 16-bit CD audio standard where the spectral content of each instrument or voice is not separately available.

For a combined video and audio signal, the audio channel may be removed completely.

Figure 10:
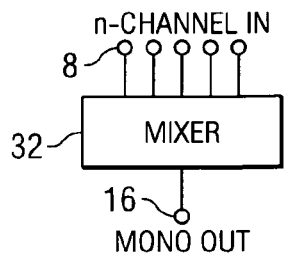
FIG. 10 shows internal structure of a digital signal processor for processing a multi-channel digital audio/video signal according to a further example.

FIG. 10 shows a further alternative structure for the processing unit 137. This structure may be used for degrading audio or video signals using hardware or software in a DSP 12. In the case of an audio data stream consisting of two or more channels, the channels can be mixed to produce a monophonic playout. The digital data streams are received at the inputs 8 and digitally mixed in a mixer 32 prior to output as the digital equivalent of a monophonic signal to the output 16. The output is shown schematically in the drawing as a single channel output, but in practice may be an n-channel output with each channel carrying a monophonic signal.

Figure 11:
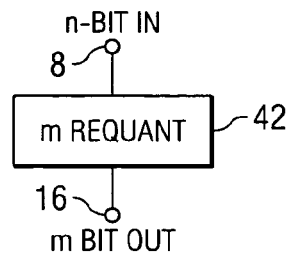
FIG. 11 shows internal structure of a digital signal processor for requantizing a digital audio signal according to a further example.

FIG. 11 shows a further example of a signal degradation technique suitable for application with a DSP. This example is for digital audio signals. An n-bit digital audio signal is supplied to the input 8. The signal may for example be a 16-bit signal. The signal is then processed by a requantization unit 42 which digitally requantizes the audio stream by to generate a digital audio signal of m bits, where m<n. The m bits then form the most significant m bits of an n-bit signal in which the m−n least significant bits are zeros. In this way, a n-bit audio signal can be output, but one that only has m bit resolution. For example, a 16-bit digital audio signal can be reduced to 12-bit audio quality. If the degrade level signal (not shown) is to be used, then this may be received at the requantization unit 42 with the value of m being varied according to the degrade level signal.

Figure 12:
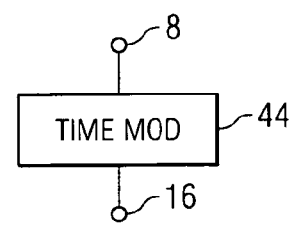
FIG. 12 shows internal structure of a digital signal processor for imposing time domain modulation on digital audio or video signal according to a further example.

FIG. 12 shows a further example of the internal structure of the processing unit 137. Again, this example may be implemented in hardware or software using a DSP 12. A time modulation unit 44 is operatively interposed between the input 8 and output 16 and serves to apply a time-domain modulation to a video or audio signal, for example using a DSP.

Time-domain modulation may be a random, pseudo-random, or regular speed-up or slow-down of the data stream. This may for example use well-known re-sampling and interpolation techniques. The sampling frequency of the data stream may be varied randomly, cyclically, or in a pseudo-random fashion.

One implementation of time modulation is specifically applicable to a digital signal with both video and audio content, wherein the audio content preferably has a musical or vocal contribution. In this implementation, time modulation is performed by a processor, preferably a DSP, to modulate the perceived time scale of the audio content, preferably the musical or voice content. The processing algorithm may be based on an overlap and add (OLA) algorithm, or a modified version thereof referred to as SOLA, as described in U.S. Pat. No. 5,749,064 (Pawate and Yim) the contents of which is incorporated herein by reference. Alternatively one of the alternative time modulation algorithms referred to in this US patent or the time modulation algorithms disclosed in the documents cited during prosecution of this US patent may also be used, the contents of which are also incorporated herein by reference. These time modulation methods have found use in Karaoke machines and are known from that art. In the context of the present embodiment, the time modulation is applied to change the key or pitch of a musical or voice channel or channels. For example, in a movie or music video, a male voice may be effectively changed to a female voice or vice versa, thereby to degrade appreciation of the product. This technique may also be used to process one or more channels of an audio signal in which the separate tracks are available, such as in a master recording. For example, the lead vocal track or tracks of an operatic or popular music recording may be processed by time modulation in this way.

Figure 13:
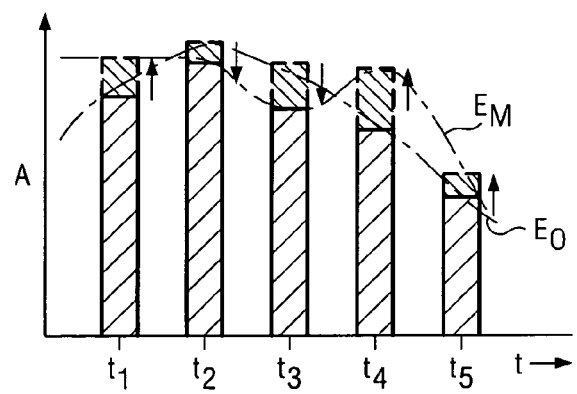
FIG. 13 graphically represents a time modulation process applicable with the apparatus of FIG. 12.

FIG. 13 shows one form of time modulation of a data stream $A_n(t)$ in which the analog envelope $E_o$ (dot-dashed line) of the original signal $A_n(t)$ is modulated to form a modified signal $A'_n(t)$ having an analog envelope $E_M$ (dot-dash-dash line). This is achieved in the illustrated example by randomly increasing and decreasing the value of each datum, for example to vary the volume associated with each 16-bit word in the case of a 16-bit sampled CD audio data stream, or to vary the luminance or chrominance information of individual data blocks in a video data stream.

Figure 14A:
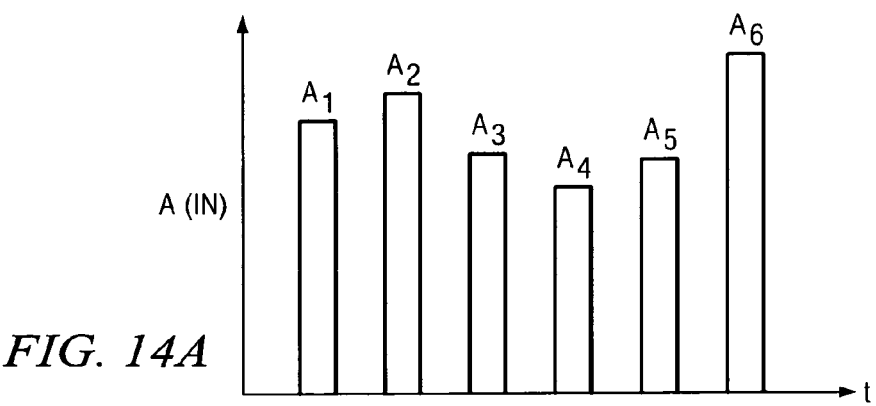
FIG. 14A and FIG. 14B graphically represent another time modulation process applicable with the apparatus of FIG. 12.
Figure 14B:
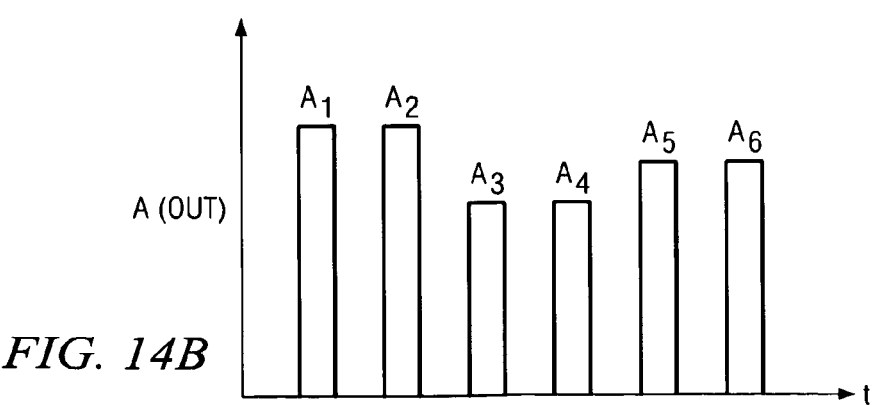

FIG. 14A and FIG. 14B show another form of time modulation in which the sampling period is effectively doubled by setting the value of every other datum to the value of the preceding datum. Thus an input data stream A(in) as shown in FIG. 14A, consisting of successive data elements of amplitude $A_1$, $A_2$, $A_3$, $A_4$, $A_5$, $A_6$ etc. is modulated into an output data stream $A_1$, $A_1$, $A_3$, $A_3$, $A_4$, $A_4$ etc., as shown in FIG. 14B, with the data values for the even numbered data elements being written over by the immediately preceding data value. The sampling period can be lengthened by any desired factor, not just two, and with a variety of other techniques. This technique is applicable to video as well as audio data streams. In the context of video, the sampling frequency may be that of the frame rate so that lengthening the sampling period corresponds to lowering the frame rate. In MPEG video, reducing the sampling period may also correspond to picture element amalgamation so that the number of independent picture elements per block is reduced. For example an 8×8 pixel block may be reduced to 4×4 resolution by overwriting the even numbered pixels in each row or column with the data values of the immediately preceding odd numbered pixels.

The time modulation may also take the form of a non-linear compression or expansion which modifies the data stream, for example randomly. (Compression is a non-linear modification of the signal to make the resulting analog envelope more uniform and expansion is the reverse process of making the resulting analog envelope less uniform). In a digital audio signal, compression may for example take the form of injecting bits into the frequency mid-range and removing bits from the high frequency range.

In the following, examples of frequency and time domain masking and marking techniques are discussed as used to process digital audio signals for pre-purchase listening. The masking and marking techniques can be implemented by a DSP of the kind shown in FIG. 3.

Masking is first described. The phenomenon of auditory masking causes high-amplitude sounds to mask lower-amplitude sounds which are located nearby in frequency or time. Masking in the following examples is effected by the insertion of frequency components, as viewed in a frequency domain representation of a digital audio signal, in such a manner that there is little or no perceived change in the perceived fidelity of the audio signal.

The masking process may be combined with a signal degradation process or may be non-degrading and performed separately from the signal degradation process.

Examples of independent, non-degrading masking processes are described first. (In these examples it is assumed that the signal is degraded by a separate process, for example by one of above-described frequency or time modulation techniques).

Figure 15:
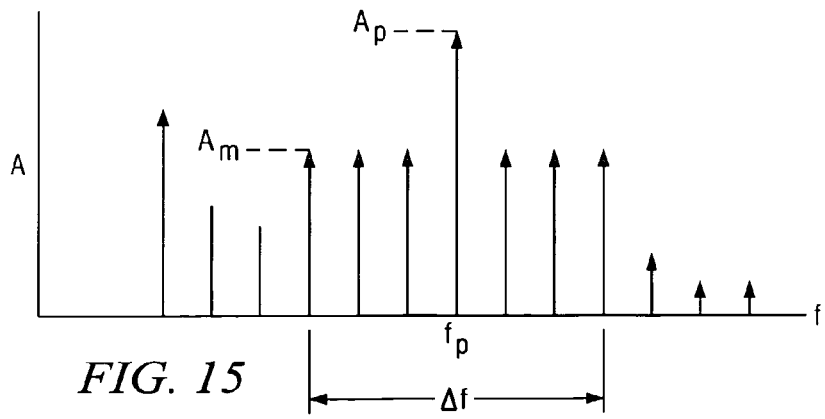
FIG. 15 shows a first form of masked sound insertion by way of a frequency domain representation of a digital audio signal.

When in the frequency domain, frequency components which constitute amplitude peaks with an amplitude greater than a threshold amplitude are determined. FIG. 15 shows one amplitude peak occurring at a frequency $f_p$ and having an amplitude $A_p$. As shown in FIG. 15, the frequency coefficients lying within a frequency band of width $\Delta f$ centered around the frequency of the amplitude peak are set to an amplitude $A_m$. The mask bandwidth $\Delta f$ and mask amplitude $A_m$ are set to values known to produce no significant humanly audible change in the signal. The values may be dependent on peak frequency $f_p$ and also peak amplitude $A_p$. Instead of setting all the amplitudes to the same value $A_m$ within the mask bandwidth, a functional envelope could be used to define $A_m(f)$.

Figure 16:
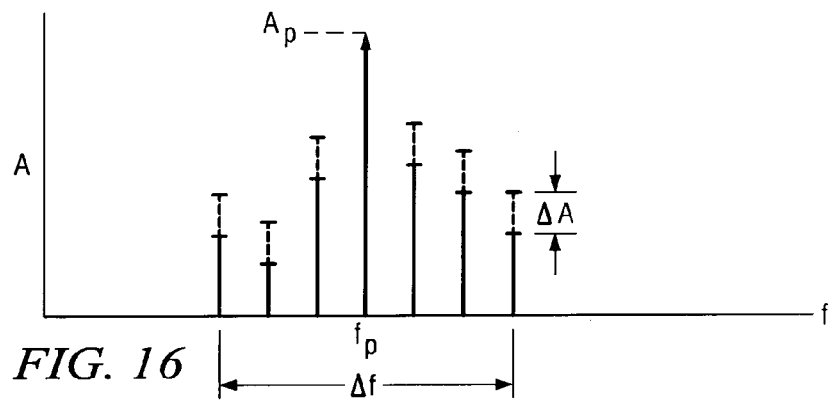
FIG. 16 shows a second form of masked sound insertion by way of a frequency domain representation of a digital audio signal.

In a modified example, shown in FIG. 16, the frequency coefficients lying within a frequency band of width $\Delta f$ centered around the frequency of the amplitude peak of amplitude $A_p$ are incremented by an increment $\Delta A$ known to be imperceptible to a listener. The size of the increment may be a function of the peak amplitude and peak frequency $f_p$. The added contributions are said to be "masked" since they cause no perceived change in the reproduced sound.

In the above examples, the masking process is performed in the frequency domain. Referring to the degradation example illustrated in FIGS. 5A to 5F, the masking process can be performed before or after the signal-degrading frequency-domain modulation shown in FIG. 5D. If signal degradation is based on modulation in the frequency domain, then masking is preferably performed concurrently with the signal-degrading frequency domain modulation. However, if the signal degradation is not performed in the frequency domain, then masking will be performed as a separate process and include FFT and inverse FFT steps.

An example of a combined degrading and masking process is now described with reference to FIG. 17 and FIGS. 18A and 18B.

Figure 17:
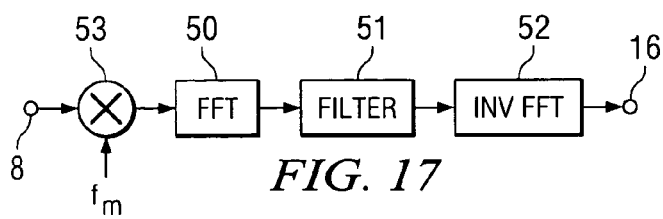
FIG. 17 shows the process flow for a combined masking and marking process as applied to a digital audio signal.
Figure 18A:
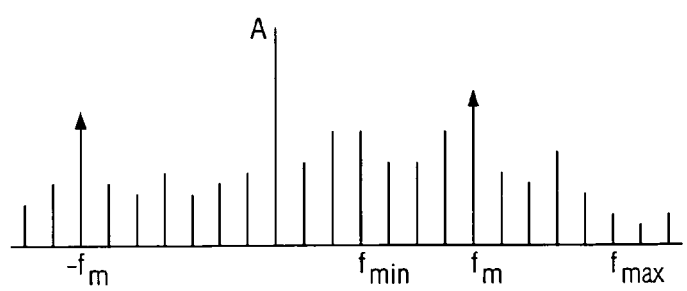
FIG. 18A is a frequency domain representation at one stage of the process of FIG. 17.
Figure 18B:
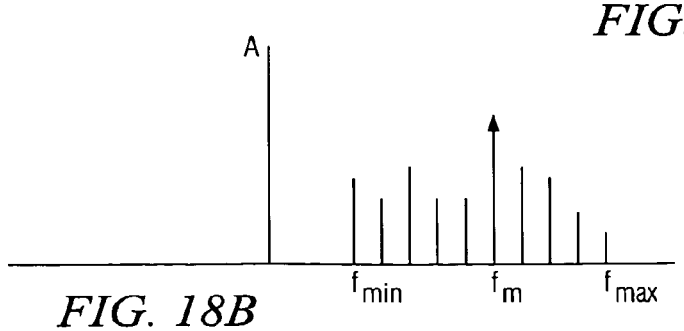
FIG. 18B is a frequency domain representation at another stage of the process of FIG. 17.

As shown in FIG. 17, a digital audio signal is input at 8 and is convolved with a mixing frequency $f_m$ in a mixer 53. The output of mixer 53 is subjected to a DFT in an FFT unit 50 and thus converted into the frequency domain. The frequency domain signal may appear as shown schematically in FIG. 18A and will generally include negative frequency components and non-zero frequency coefficients outside the frequency range $f_{min}$ to $f_{max}$ of interest. The frequencies $f_{min}$ and $f_{max}$ may for example define a frequency range bounded by the lower and upper frequencies to which the human ear is responsive, or a sub-set of the audible frequency range. The frequency domain signal is then modulated in the filter unit 51 by removal of the negative and out-of-range frequency components as shown in FIG. 18B. Masked frequency contributions are then added to the frequency domain signal around the mixing frequency $f_M$ which will have a significant amplitude. The masked frequency contributions may be added in the manner described with reference to FIGS. 15 and 16, and associated text, where $f_M$ is treated as the peak frequency $f_p$. Moreover, it will be understood that in this example peaks other than the peak at the mixing frequency may be identified for the insertion of masked contributions, as also described with reference for FIGS. 15 and 16.

Marking is the variation with time of the mixing frequency $f_M$ so that $f_M=f_M(t)$. Time variation may take the form of a framewise variation in a digital video signal or a frequency modulation type effect in an audio signal, for example. Referring to the apparatus of FIG. 17, the mixer 53 mixes a frequency $f_M$ with the input signal and the filter 51 trims the signal to remove negative and out-of-range frequency components. FIGS. 18A and 18B are thus also representative of masking.

To eliminate the degrading effect of the mixing frequency, a hacker would have to establish the time evolution of the mixing frequency along the digital data stream, i.e. the nature of $f_m(t)$, which would be a difficult task. By using a randomly assigned mixing frequency to modulate selected frequency ranges of music, for example, one can degrade the spectral quality of the music in a controlled manner. Any attempt to reconstruct the original music using demodulation would require the use of exact mixing frequencies at exact frequency ranges. If erroneous mixing frequencies or erroneous frequency ranges are used, then the music will not be reconstructed and would be further degraded by the attempted reconstruction procedure, since anomalies would be introduced into other parts of the audio spectrum.

More generally, the purpose of masking the degraded signal in embodiments of the invention is to make it more difficult for a hacker to reconstruct a high-fidelity signal from the degraded digital audio signal. The removal of the deliberate distortions inserted to degrade signal quality is rendered more difficult by masking, since any attempt to manipulate the signal using Fourier transform, correlation, deconvolution or related techniques would tend to redistribute at least part of the energy associated with the masked frequency components away from the cover of the associated amplitude peak. As a result, the noise or tones that were added so as to be masked will become unmasked and thus audible. Manipulation of the degraded digital audio signal by a hacker would thus tend to degrade the fidelity still further.

Marking will also tend to have the same effect, i.e. the effect that speculative manipulation will further degrade the degraded digital audio signal. If a hacker attempts to cancel the mixing frequency $f_M$ by deconvolving with a guessed mixing frequency $f_D$ then this will be a highly laborious process, since the frequency will vary with time in a non-simple functional form.

Furthermore, if marking and masking have been used in combination to insert masked sound around the mixing frequency then it will be even more difficult for the hacker, since, in an iterative hacking process, it will be still more difficult to find a convergence between $f_D$ and $f_M$.

In addition to frequency domain masking, it will be understood that known time domain masking processes may also be applied to add masked noise, tones or instruments.

Apparatus and processes for manipulating MPEG digital video data streams to degrade perceived content quality are now discussed. To aid understanding of the degradation techniques, a brief summary of some basic features of MPEG2 and MPEG4 are first described.

An MPEG2 or MPEG4 video sequence is made up of data packets each containing header codes and a group of pictures (GOP). In turn, a GOP is made up of a plurality of pictures or frames. Each picture is made up of picture elements (pixels) which are grouped into blocks, typically of 8×8 pixels. The blocks are in turn combined into macro-blocks which contain, k blocks of luminance information, l blocks of chroma information for the color difference CB, and m blocks of chroma information for the color difference CR. The macroblock size is referred to as (k,l,m), where k is usually 4, l is usually 2 or 4, and m is usually 0, 2 or 4. The macroblocks are combined to form slices, and the slices combined to form a frame.

MPEG2 and MPEG4 use three different types of frames, namely I-frames, P-frames and B-frames. A typical MPEG frame sequence of a GOP is shown in FIG. 19.

Figure 19:
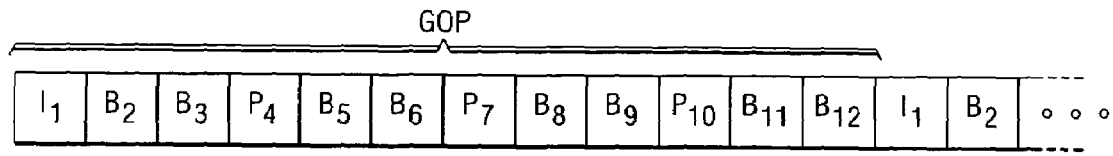
FIG. 19 shows a group of pictures in an MPEG video data stream.

Referring to FIG. 19, a GOP having 12 compressed frames is shown. The I-frames are stand-alone frames containing all the data necessary to display a still image. By contrast, the P- and B-frames both require reference to other frames of the GOP to allow reconstruction. P-frames use a single previously reconstructed I- or P-frame as the basis for prediction calculations. B-frames use both forward and backward interpolated motion prediction to reconstruct a frame on the basis of both past and future reconstructed I- and P-frames. Thus, I- and P-frames serve as a basis for reconstruction of future P- or B-frames. As a consequence, I-frames in the GOP are the seed for all P- and B-frames, both P- and B-frames being reconstructed from I- and P-frames. To reduce the bandwidth requirements, the MPEG standards are designed to allow a certain number of P-frames to be inserted between each I-frame and, in turn, a certain number of B-frames to be inserted between the P- and I-frames. In FIG. 19, for example, an I-frame occurs every twelfth frame with intervening P-frames every fourth frame and two B-frames between the adjacent I- and P-frames.

In addition, MPEG2 and MPEG4 make use of the concept of two-dimensional motion vectors to increase data compression when video sequences contain movement. In MPEG2 macroblocks are the basic element for motion vector calculation. In MPEG4, objects are the basic element for motion vector calculation. The frames of the GOP refer to macroblocks or objects in terms of their speed and direction, thereby to allow reconstruction of B-frames in particular on a predictive basis.

Figure 20:
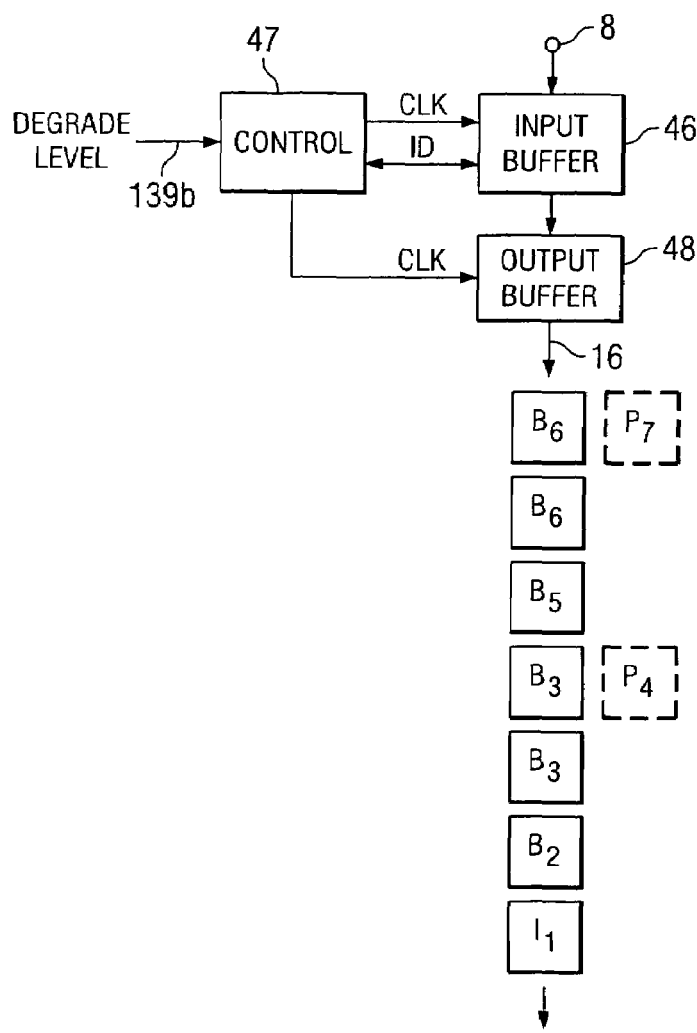
FIG. 20 shows internal structure of the processing unit according to an example for processing MPEG video data.

FIG. 20 shows a first example of the signal processing unit 137 for degradation of content quality of an MPEG digital video stream. In this example, the signal processing unit 137 preferably comprises a DSP.

The MPEG data stream is clocked into an input buffer 46 in a framewise manner under the control of a controller 47. The controller 47 acts to determine the frame type of the frame held in the input buffer 46. If the frame type is identified as type I or B, then the frame is transferred to an output buffer 48. On the other hand, if the frame type is identified as type P, then the frame is held in the input buffer 46. In both cases, the controller clocks the output buffer 48 to output the frame held therein to the output line 16. The P-frame held in the input buffer 46 is overwritten without ever having been transferred to the output buffer 48 when the next frame is clocked in. The controller 47 is arranged to receive the degrade level signal 139b and in response thereto selectively intervene to overwrite only a fraction of the P-frames, where the fraction overwritten is proportional to the degrade level.

In this way, P-frames are overwritten with the immediately preceding B-frame. The lower part of FIG. 20 illustrates the output sequence using the GOP shown in FIG. 19 as the input received at the input 8 for the case that all P-frames are to be overwritten. As illustrated, the apparatus shown in FIG. 20 has the effect of overwriting the frames $P_4$ and $P_7$ (shown dotted) with the frames $B_3$ and $B_6$ respectively. By replacing the P-frames with their immediately preceding B-frames, picture quality will be degraded since cumulative errors will build up in the B-frames as a result of their interpolation from more remote I- and P-frames. This degradation process has the advantage that no manipulation of the data itself is required so that the amount of processing activity is relatively low.

Figure 21:
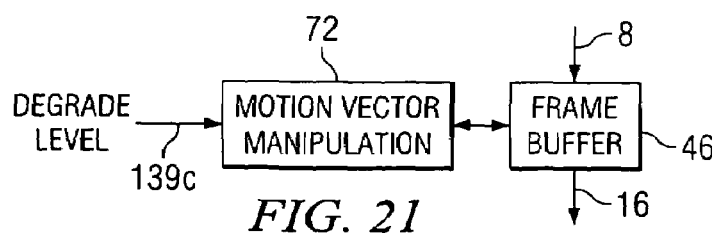
FIG. 21 shows internal structure of the processing unit according to another example for processing MPEG video data.

FIG. 21 shows a further example of the signal processing unit 137 for degradation of content quality of an MPEG digital video stream, for example a video stream conforming to MPEG2 or MPEG4. In this example, the signal processing unit 137 preferably comprises a DSP. As illustrated in FIG.

21, a frame buffer 46 is operatively inserted between the input 8 and the output 16. A motion vector manipulation unit 72 is arranged to identify and modify the motion vector data of a frame held in the frame buffer 46. The modification may be by way of imposing a random incremental change to the motion vector. The motion vector manipulation unit 72 may be arranged to modify only the motion vectors of selected frames, for example P-frames. The size of the motion vector modification can be made dependent on the degrade level signal 139c received at an input of the vector manipulation unit 72. The errors introduced in the P-frames will then propagate automatically through to dependent B-frames when the GOP is reconstructed for playback. However, the extent of the degradation cannot become uncontrolled, since the I-frames will refresh the image correctly at the beginning of each GOP.

FIG. 22 illustrates another example of the signal processing unit 137 for degradation of content quality of an MPEG digital video stream, also suitable for MPEG2 or MPEG4. In this example the data is manipulated at the block level. Digital video data is transmitted through a frame buffer 46 and a frame identifier 74 is arranged to look at the buffer 46 and identify the frame type. If the frame type is I-type then the frame identifier 74 acts to close a switch 75 to route a noise contribution generated by a pseudo-random signal generator 76 to one input of an adder 77 the other input of which receives the digital video data from the frame buffer 46. In this way noise contributions are added to the blocks. Noise may be added only to the luminance blocks, or only to the chroma blocks of the macroblocks, or to both luminance and chroma data. The level of noise can be controlled by the pseudo-random signal generator 76 responsive to the degrade level signal 139d received thereby. Preferably, noise is only added to the I-frames, since this has the maximum degradation effect for the least processing, since noise in the I-frame will be propagated through all dependent P- and B-frames. However, it will be understood that the frame identifier 74 and switch 75 could be omitted in which case each frame will have noise added to its data blocks.

FIG. 23 illustrates another example of the signal processing unit 137 for degradation of content quality of an MPEG4 digital video stream. In this example, an object identifier 78 is arranged to identify an object in a frame held in an input-side frame buffer 46a arranged to receive data from the input 8. The object identifier 78 is arranged to output an identifier for an identified object to an object manipulation unit 79 which in turn manipulates the object concerned in the frame clocked through to an output-side frame buffer 48a. Manipulation may take the form of object removal or replacement of the object with a dummy object, which may be selected randomly from a library, for example. Alternatively, the object identifier may be configured to identify two or more objects, in which case the manipulation may take the form of interchanging the object positions within the frame. It will be appreciated that this example is applicable not only to MPEG4, but also to any other MPEG or other standard that uses objects.

Referring back to the examples of FIGS. 20 to 23 it will be understood that the various degradation processes may be combined cumulatively. For example, noise insertion into I-frames may be readily combined with the overwriting of P-frames, motion vector manipulation, or object manipulation. If combined use is made of these techniques, the nature of the combination may be made a composite function of the degrade level. For example, motion vector manipulation and object manipulation may be reserved for higher degrade levels, with lower levels of degradation being implemented with I-frame noise insertion or P-frame overwriting.

Having described a number of digital audio/video signal degradation techniques particularly suitable for implementation with a DSP, some analog-based techniques for degrading digital audio/video signals are now described.

FIG. 24 shows the internal structure of the signal processing unit 137 according to a first example which is generic to a number of analog-based audio and video degradation techniques. As illustrated in FIG. 24, a digital data stream is received through the input 8 and converted into an analog signal by a data converter 1000. The thus converted analog signal is then passed to an analog processing unit 1200 responsible for degrading the audio or video content quality. The amount of degradation is dependent on the degrade level signal 139e input to the analog processing unit 1200. The degraded analog signal is then supplied to a data converter 1400, where it is converted into digital form conforming to the same standard as the input digital data stream received at the input 8. The degraded digital data stream is then supplied to the signal processing unit output 16 for output to the client 120 through the communication link 160.

For audio signals, the analog processing unit 1200 may, for example, act as a frequency domain modulator.

One form of frequency domain modulation that may be used is band-reject filtering, sometimes referred to as notch filtering. The center frequency and passband width of the band-reject filter can be selected based on a pseudo-random number sequence with a very long period. The audio stream can then be processed with a notch filter to change its spectral characteristics. In addition, the center frequency and passband width can be changed periodically.

Another form of frequency domain modulation that may be used is low-pass filtering to remove, or attenuate, spectral components above a selected frequency. If the high-frequency components are attenuated, rather than being removed, high-frequency noise is preferably added to prevent restoration of the high quality original signal by a filter which compensates for the attenuation. Instead of, or as well as, low-pass filtering, the analog processing unit 1200 may be configured to perform high-pass filtering, or attenuation below a selected frequency. Similar design considerations apply as for low-pass filtering.

In the above frequency domain modulation examples, the degrade level can be used in determining the range of removed or attenuated frequencies according to the subjective significance of the frequencies concerned to a listener.

For video signals, the analog processing unit 1200 is operable to modulate an analog video signal.

In one example, the analog processing unit 1200 includes an impedance discontinuity which results in "ghosts" in the processed video signal by inducing transmission line reflections. The size of the impedance discontinuity can be made variable according to the degrade level signal 139e.

In another example, the analog processing unit 1200 acts to insert a time delay in the analog TV signal between the sync pulse and part or all of the following brightness-conveying signal. The analog processing unit 1200 may include a sync pulse detector and a delay line connected to receive a sync pulse detection signal from the sync pulse detector, the delay line being responsive to the sync pulse detection signal so as to lengthen the back porch part of the signal by a duration proportional to the degrade level signal amplitude, thereby to vary the blanking period. This can be an effective method of signal degradation, since the relative position of the sync pulse to the following brightness signal is critical for good interlace in the displayed picture.

FIG. 25 shows a second example of the internal structure of the signal processing unit 137. On the input side, the digital data stream is received through the input 8 and rendered into an analog signal by a data converter 1000. On the output side, there is a data converter 1400 for reconstituting the digital data stream, the converter 1400 being arranged to supply the digital data stream to the output 16. The degrade level signal 139e is received as a further input. A signal generator 1800 is provided, the output of which is supplied to an amplifier 2000. The gain of the amplifier 2000 is controlled by the degrade level signal 139e. The output of the amplifier 2000 is received at one input of a mixer 2200, the other input of which receives the high-fidelity data stream. The mixer 2200 thus serves to mix the high-fidelity signal with a secondary signal generated by the signal generator 1800. The level of the signal contribution received from the signal generator 1800 is determined by the gain of the amplifier 2000, which is in turn determined by the degrade level signal 139e. Finally, the output of the mixer 2200 is supplied, through the data converter 1400, to the signal processing unit output 1600 to the client 120. The signal generator, amplifier and mixer are analog components in this example. An analog-to-digital converter (not shown) may be required to convert the degrade signal 139e into analog form prior to supply to the amplifier 2000.

The signal generator 1800 may be a source of noise. For example, the signal generator 1800 may be a pseudo-random noise generator with a very long period used to generate low level audible noise with desired spectral and/or temporal characteristics. Especially for classical audio recordings, the noise generator may generate one or more of the rumble, hiss and popping sounds of an old, possibly scratched, vinyl or acetate recording. In the case of a video signal, the addition of random noise generated by the signal generator 1800 can be used to cause "snow" in the degraded picture.

In the case of audio signals, as an alternative to noise, the signal generator 1800 may be a source of a secondary audio signal, for example a speech bearing signal. In the case of a music product, the speech signal generated by the signal generator 1800 can thus be added to cause a voice-over of the music, thereby spoiling the appreciation of the music. This could be achieved with a D.J. voice-over for popular beat music or a monotonic nasal announcer for classical music. The music can thus be rendered unusable for high quality listening, while still allowing the listener to verify that the correct audio stream has been selected, and that the music is worthy of purchase.

FIG. 26 shows a further alternative structure for the signal processing unit 137. An n-channel digital audio/video signal is received at the input 8 and is decoded and converted to analog form by a data converter 1000. A mixer 3200 is arranged to receive and mix the n-channel analog audio/video signal. The mixed signal is then digitized by a data converter 1400 arranged on the output side of the mixer 3200, the data converter 1400 being arranged to supply the mixed digital video/audio signal to an output 16.

In the case of an audio data stream consisting of two or more channels, the channels can be mixed to produce a monophonic playout.

In the case of a video signal, the mixer 3200 can serve to logically OR the RGB color channels to obtain a UVB monochrome signal for output to the output 16.

The example of FIG. 26 may be modified by replacing the mixer 3200 with a channel attenuator or remover. For example, x channels of the n-channel signal can be removed or attenuated. For a multi-channel audio recording, channel removal may serve to remove one or more instruments from the multi-track recording.

Figure 27:
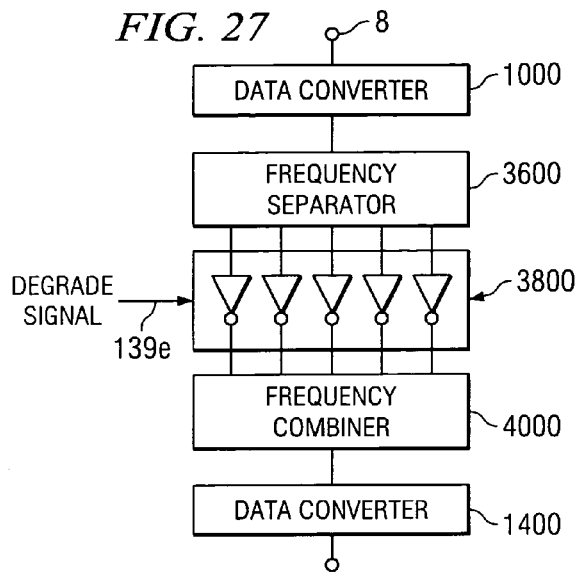
FIG. 27 shows internal structure of a processing unit using analog processing techniques according to a fourth analog example.

FIG. 27 shows a further example of the internal structure of the signal processing unit 137 suitable for processing digital audio signals. The input 8 is connected to a data converter 1000 for converting the digital audio signal into an analog audio signal. The data converter 1000 is connected to a frequency separator 3600 operable to separate the analog audio signal into a plurality of spectral frequency bands. The separate frequency bands are then supplied to a phase inversion unit 3800 comprising a plurality of filters 3900, one for each of the frequency bands. The degrade level signal 139e serves as a control signal for activating selected ones of the filters 3900 so as to apply phase inversion to none, one or more of the frequency bands. After processing by the inversion unit 3800 the separate frequency band signals are applied to a frequency combiner 4000 where the analog signal is re-constructed and then supplied to the output 16 after digitizing in data converter 1400. The frequency bands selected for phase inversion may be varied with time, for example in a random or pseudo-random fashion, or by sequential polling, thereby to provide a further subjective impression of quality degradation in the output signal. In its simplest form, there may be provided only a single filter 3900 for phase inversion of one of a plurality of frequency bands.

With any of the above-described digital or analog based degradation apparatus and processes, the following decoder apparatus and methods may be used to further enhance security against repeated playing or a pre-purchase digital audio or video product supplied over a network connection.

Figure 28:
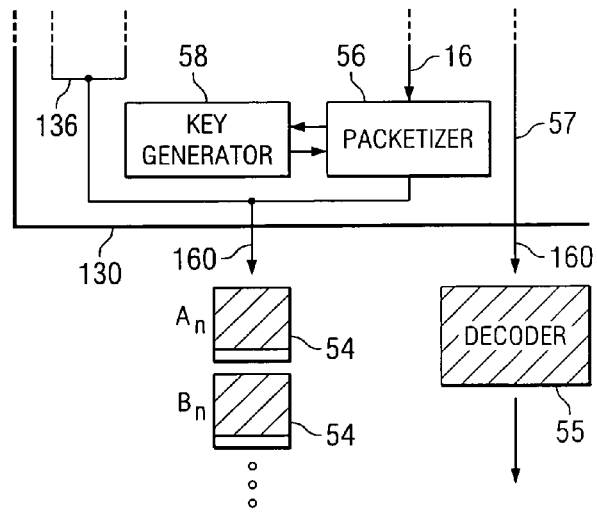
FIG. 28 shows an output stage of a server using a ship-ahead, play-once decoder.

FIG. 28 shows an output stage of the server 130. The output stage is arranged to receive and packetize the stream of digital video/audio data received from the signal processing unit 137 on the communication line 16. The output stage comprises a packetizer 56 and a key generator 58. The packetizer 56 separates the data stream into data packets 54, wherein the data in each data packet 54 is encoded using a encryption key $A_n$, $B_n$ . . . allocated by the key generator 58, which includes a pseudo-random number generator for generating the keys. The encrypted data in the data packets 54 can be decrypted with a suitable decoder 55 in combination with the associated encryption key. The server 130 supplies, or "ships ahead", the decoder 55 to the client 120 prior to transmission of the data packets 54 containing the degraded digital video/audio product. The decoder 55 is supplied by the dialogue unit 135 through communication line 57. A number of different decoders 55 can be held in the file store 131, and the dialogue unit 135 configured to change the decoder periodically.

Figure 29:
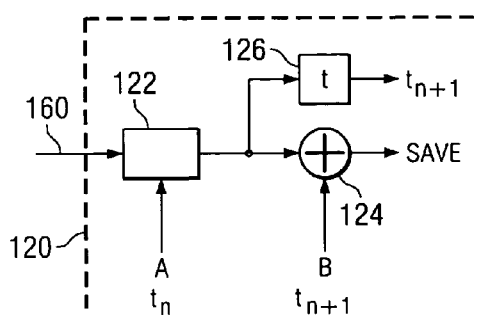
FIG. 29 shows an input stage of a client using a ship-ahead, play-once decoder.

FIG. 29 shows the corresponding decrypting input stage at the client 120. The decoder 55 which has been shipped ahead is loaded into a decoder unit 122 for decoding the data packets 54 and re-creating a data stream suitable to be played by the video or audio player. The packet stream is received at the input of the client 120 through the communication line 160 and the encryption key $A_n$ is read by the decoder unit 122 which decodes the data of the packet according to the packet's key value. The decoded data is then supplied to a delay line 126 and to a corruption unit 124. The corruption unit 124 has a pseudo-random number generator and is arranged to add a pseudo-random number to the encryption key of each data packet 54, thereby overwriting the true key. The delay line 126, which may be latched by the action of the corruption unit 124, is configured so that output of the decoded digital data stream associated with any given packet to the player does not occur until the key of the corresponding data packet has been overwritten by the corruption unit 124.

The ship-ahead decoder described above with reference to FIG. 28 and FIG. 29 thus allows the product to be played only once, or for a limited number of plays or a limited time period, and prevents further repeated playing of the video or audio product supplied only for the purpose of pre-purchase evaluation. This is especially useful in combination with degradation of the content quality at the server 130, but it will be understood that the play-once ship-ahead decoder design may also be used without degradation to supply a high-fidelity pre-purchase sample of a product. In the context of the server 130 as illustrated in FIG. 2, the packetizer would then be arranged as an output stage of the reader 134 and the signal processing unit 137 and control switch 136 omitted.

Although a particular combination has been described for the play-once ship-ahead decoder, there are clearly other commercially available types of software decoders that allow for single or multiple uses or use for a limited time period that may be employed within the concepts of the present invention.

It will be appreciated that although particular embodiments of the invention have been described, many modifications/additions and/or substitutions may be made within the spirit and scope of the present invention.

The invention claimed is:

1. A method of operating a server of a merchant computer system, the method comprising:
 inviting a client to make a selection from a range of audio/video products stored by the server in product files;
 receiving a client selection for evaluation of one of the products;
 reading the selected product file to generate a digital audio/video signal;
 defining a level of content degradation dependent on an authorization response received by the server from a remote payment gateway computer system following an authorization request by the server including a client i.d., a client payment instrument and a monetary value of the product selected for evaluation;
 applying the defined level of content degradation to the digital audio/video signal to generate a degraded digital audio/video signal having a degradation in perceived quality corresponding to said defined level of content degradation; and
 outputting the degraded digital audio/video signal to the client.

2. A method of communicating between a client, server and gateway on a computer network, the method comprising:
 a) the client establishing communication with the server to identify the client and a client payment instrument to the server;
 b) the server transmitting to the client a range of audio/video products for supply in return for payment;
 c) the client transmitting to the server an evaluation request for one of the products;
 d) the server and gateway communicating to obtain payment authorization for the requested product from the payment instrument;
 e) the server defining a level of content degradation as a function of said client payment instrument;
 f) the server transmitting to the client a degraded evaluation version of the selected product, the degraded evaluation version of the selected product having a degraded perceived quality corresponding to the level of content degradation;
 g) the client transmitting to the server a payment decision;
 h) the server and gateway communicating to effect payment capture for the authorized payment; and
 i) the server transmitting to the client a non-degraded version of the selected product.

3. The method of claim 1, wherein:
 the plurality of differing types of payment authorizations includes at least one selected from the group consisting of credit card, debit card, electronic cash, electronic check and smart card.

4. The method of claim 1, wherein:
 said step of outputting the degraded audio/video signal takes place without charging the client payment instrument.

5. The method of claim 1, wherein:
 said step of applying a defined level of content degradation includes inserting noise into the digital audio/video signal to degrade signal quality.

6. The method of claim 1, wherein:
 said step of applying a defined level of content degradation includes:
 performing a discrete Fourier transform on the digital audio/video signal to obtain a frequency domain representation of the digital audio/video signal;
 frequency modulating the frequency domain representation of the digital audio/video signal; and
 performing an inverse discrete Fourier transform unit on the frequency modulated frequency domain representation of the digital audio/video signal to reconstruct a time domain representation of the digital audio/video signal;
 wherein the frequency modulating effects a degradation of perceived signal quality in the reconstructed digital audio/video signal.

7. The method of claim 6, wherein:
 said step of frequency modulating includes one or more of the following frequency band rejection, frequency low pass filtering and frequency high pass filtering to effect a degradation of perceived signal quality.

8. The method of claim 6, wherein:
 said step of frequency modulating includes phase inversion over at least one range of frequency components to degrade signal quality.

9. The method of claim 6, wherein:
 said digital audio/video signal includes a digital audio signal; and
 said step of frequency modulating includes inserting masked sound contributions adjacent amplitude peaks of the frequency domain representation of the digital audio signal to degrade signal quality.

10. The method of claim 6, further including the step of:
 mixing a signal with the digital audio/video signal before performing the discrete Fourier transform to effect a degradation of perceived signal quality.

11. The method of claim 10, further comprising:
 frequency modulating the digital audio/video signal following mixing and before the performing the inverse discrete Fourier transform, the frequency modulating including band-pass filtering to suppress frequency contributions lying outside a selected frequency range to effect a degradation of perceived signal quality.

12. The method of claim 11, wherein:
 said frequency modulating includes inserting masked sound contributions adjacent the mixing frequency to degrade signal quality.

13. The method of claim 1, wherein:
 the digital audio/video signal includes a digital video signal;
 the method further comprising:
 holding frames of the digital video signal in a frame buffer; and manipulating frames held in the frame buffer to generate a degraded digital video signal.

14. The method of claim 13, wherein:
the digital video signal consists of an MPEG standard video signal including as frame types I-frames, P-frames and B-frames; and
wherein said step of manipulating frames includes
identifying the frame type of frames held in the frame buffer, and
performing frame manipulation of held frames according to frame type so as to effect a degradation of perceived video signal quality.

15. The method of claim 13, wherein:
the digital video signal consists of an MPEG standard video signal including data blocks, each comprising a plurality of pixels; and
wherein said step of manipulating frames includes varying the pixels of the data blocks of at least selected ones of held frames so as to effect a degradation of perceived video signal quality.

16. The method of claim 13, wherein:
the digital video signal includes an MPEG standard video signal including motion vectors; and
wherein said step of manipulating frames includes varying the motion vectors of at least selected ones of the held frames so as to effect a degradation of perceived video signal quality.

17. The method of claim 13, wherein:
the digital video signal consists of an MPEG standard video signal including objects; and
wherein said step of manipulating frames includes manipulating the objects of at least selected ones of the held frames so as to effect a degradation of perceived video signal quality.

18. The method of claim 1, wherein:
said digital audio/video signal includes a multi-channel digital audio signal; and
said step of applying the defined level of content degradation includes switching individual channels within the multi-channel digital audio signal to apply spatial modification to the digital audio signal so as to effect a degradation of perceived digital audio signal quality.

19. The method of claim 1, wherein:
said digital audio/video signal includes a multi-channel digital audio signal; and
said step of applying the defined level of content degradation includes inverting the phase of at least one of the channel of the multi-channel digital audio signal so as to effect a degradation of perceived digital audio signal quality.

20. The method of claim 1, wherein:
said digital audio/video signal includes a multi-channel digital audio signal; and
said step of applying the defined level of content degradation includes adding together individual ones of the channels of the multi-channel digital audio signal so as to effect a degradation of perceived digital audio/video signal quality.

21. The method of claim 1, wherein:
said digital audio/video signal includes a multi-channel digital audio signal; and
said step of applying the defined level of content degradation includes at least one of removing or attenuating of at least one of the channels of the multi-channel audio signal so as to effect a degradation of perceived digital audio/video signal quality.

22. The method of claim 1, wherein:
the digital audio/video signal includes an n-bit digital audio signal; and
said step of applying the defined level of content degradation includes converting the n-bit digital audio signal into an m-bit digital audio signal where m is less than n so as to effect a degradation of perceived digital audio signal quality.

23. The method of claim 1, wherein:
said step of applying the defined level of content degradation includes time modulating the digital audio/video signal so as to effect a degradation of perceived digital audio signal quality.

24. The method of claim 23, wherein:
said step of time modulating the digital audio/video signal to degrade signal quality includes at least one of:
speeding-up or slowing-down the digital audio/video signal;
changing in the value of data bits in volume, luminance or chrominance data contained within the digital audio/video signal; and
lengthening of a sampling period of the digital audio/video signal.

25. The method of claim 1, wherein:
said step of applying the defined level of content degradation includes
converting the digital audio/video signal into an analog audio/video signal,
analog processing the analog audio/video signal creating a degraded analog audio/vided signal having a degradation in perceived quality corresponding to said defined level of content degradation, and
converting the degraded analog signal into a degraded digital audio/video signal for output.

26. The method of claim 25, wherein:
the analog audio/video signal includes an analog audio signal; and
said step of analog processing includes frequency domain modulating the analog audio signal so as to effect a degradation of perceived audio signal quality.

27. The method of claim 26, wherein:
said step of frequency domain modulating includes one or more of band-reject filtering, low-pass filtering, high-pass filtering and frequency-selective phase inversion to effect a degradation of perceived audio signal quality.

28. The method of claim 1, wherein:
said step of applying the defined level of content degradation includes adding a secondary signal to the digital audio/video signal so as to effect a degradation of perceived digital audio/video signal quality.

29. The method of claim 28, further comprising:
generating said secondary signal to degrade signal quality.

30. The method of claim 28, wherein:
said step of generating said secondary signal generates a noise signal to degrade signal quality.

31. The method of claim 29, wherein:
said step of generating said secondary signal generates a content-based audio signal to degrade signal quality.

32. The method of claim 28, wherein:
said step of adding a secondary signal to the digital audio/video signal selects a level of the added secondary signal determined by said level of content degradation to degrade signal quality.

33. The method of claim 2, wherein:
the plurality of differing types of payment authorizations includes at least one selected from the group consisting of credit card, debit card, electronic cash, electronic check and smart card.

34. The method of claim 2, wherein:
said step of said server transmitting to the client a degraded evaluation version of the selected product takes place without the client transmitting to the server a payment decision and without the server and gateway communicating to effect payment capture.

35. The method of claim 2, wherein:
said step of applying a defined level of content degradation includes inserting noise into the digital audio/video signal to degrade signal quality.

36. The method of claim 2, wherein:
said step of applying a defined level of content degradation includes:
performing a discrete Fourier transform on the digital audio/video signal to obtain a frequency domain representation of the digital audio/video signal;
frequency modulating the frequency domain representation of the digital audio/video signal; and
performing an inverse discrete Fourier transform unit on the frequency modulated frequency domain representation of the digital audio/video signal to reconstruct a time domain representation of the digital audio/video signal;
wherein the frequency modulating effects a degradation of perceived signal quality in the reconstructed digital audio/video signal.

37. The method of claim 36, wherein:
said step of frequency modulating includes one or more of the following frequency band rejection, frequency low pass filtering and frequency high pass filtering to effect a degradation of perceived signal quality.

38. The method of claim 36, wherein:
said step of frequency modulating includes phase inversion over at least one range of frequency components to degrade signal quality.

39. The method of claim 36, wherein:
said digital audio/video signal includes a digital audio signal; and
said step of frequency modulating includes inserting masked sound contributions adjacent amplitude peaks of the frequency domain representation of the digital audio signal to degrade signal quality.

40. The method of claim 36, further including the step of:
mixing a signal with the digital audio/video signal before performing the discrete Fourier transform to effect a degradation of perceived signal quality.

41. The method of claim 40, further comprising:
frequency modulating the digital audio/video signal following mixing and before the performing the inverse discrete Fourier transform, the frequency modulating including band-pass filtering to suppress frequency contributions lying outside a selected frequency range to effect a degradation of perceived signal quality.

42. The method of claim 41, wherein:
said frequency modulating includes inserting masked sound contributions adjacent the mixing frequency to degrade signal quality.

43. The method of claim 2, wherein:
the digital audio/video signal includes a digital video signal;
the method further comprising:
holding frames of the digital video signal in a frame buffer; and
manipulating frames held in the frame buffer to generate a degraded digital video signal.

44. The method of claim 43, wherein:
the digital video signal consists of an MPEG standard video signal including as frame types I-frames, P-frames and B-frames; and
wherein said step of manipulating frames includes
identifying the frame type of frames held in the frame buffer, and
performing frame manipulation of held frames according to frame type so as to effect a degradation of perceived video signal quality.

45. The method of claim 43, wherein:
the digital video signal consists of an MPEG standard video signal including data blocks, each comprising a plurality of pixels; and
wherein said step of manipulating frames includes varying the pixels of the data blocks of at least selected ones of held frames so as to effect a degradation of perceived video signal quality.

46. The method of claim 43, wherein:
the digital video signal includes an MPEG standard video signal including motion vectors; and
wherein said step of manipulating frames includes varying the motion vectors of at least selected ones of the held frames so as to effect a degradation of perceived video signal quality.

47. The method of claim 43, wherein:
the digital video signal consists of an MPEG standard video signal including objects; and
wherein said step of manipulating frames includes manipulating the objects of at least selected ones of the held frames so as to effect a degradation of perceived video signal quality.

48. The method of claim 47, wherein:
said digital audio/video signal includes a multi-channel digital audio signal; and
said step of applying the defined level of content degradation includes switching individual channels within the multi-channel digital audio signal to apply spatial modification to the digital audio signal so as to effect a degradation of perceived digital audio signal quality.

49. The method of claim 47, wherein:
said digital audio/video signal includes a multi-channel digital audio signal; and
said step of applying the defined level of content degradation includes inverting the phase of at least one of the channel of the multi-channel digital audio signal so as to effect a degradation of perceived digital audio signal quality.

50. The method of claim 47, wherein:
said digital audio/video signal includes a multi-channel digital audio signal; and
said step of applying the defined level of content degradation includes adding together individual ones of the channels of the multi-channel digital audio signal so as to effect a degradation of perceived digital audio/video signal quality.

51. The method of claim 2, wherein:
said digital audio/video signal includes a multi-channel digital audio signal; and
said step of applying the defined level of content degradation includes at least one of removing or attenuating of at least one of the channels of the multi-channel audio signal so as to effect a degradation of perceived digital audio/video signal quality.

52. The method of claim 2, wherein:
the digital audio/video signal includes an n-bit digital audio signal; and
said step of applying the defined level of content degradation includes converting the n-bit digital audio signal into an m-bit digital audio signal where m is less than n so as to effect a degradation of perceived digital audio signal quality.

53. The method of claim 2, wherein:
said step of applying the defined level of content degradation includes time modulating the digital audio/video signal so as to effect a degradation of perceived digital audio signal quality.

54. The method of claim 53, wherein:
said step of time modulating the digital audio/video signal to degrade signal quality includes at least one of:
 speeding-up or slowing-down the digital audio/video signal;
 changing in the value of data bits in volume, luminance or chrominance data contained within the digital audio/video signal; and
 lengthening of a sampling period of the digital audio/video signal.

55. The method of claim 2, wherein:
said step of applying the defined level of content degradation includes
 converting the digital audio/video signal into an analog audio/video signal,
 analog processing the analog audio/video signal creating a degraded analog audio/vided signal having a degradation in perceived quality corresponding to said defined level of content degradation, and
 converting the degraded analog signal into a degraded digital audio/video signal for output.

56. The method of claim 55, wherein:
the analog audio/video signal includes an analog audio signal; and
said step of analog processing includes frequency domain modulating the analog audio signal so as to effect a degradation of perceived audio signal quality.

57. The method of claim 56, wherein:
said step of frequency domain modulating includes one or more of band-reject filtering, low-pass filtering, high-pass filtering and frequency-selective phase inversion to effect a degradation of perceived audio signal quality.

58. The method of claim 2, wherein:
said step of applying the defined level of content degradation includes adding a secondary signal to the digital audio/video signal so as to effect a degradation of perceived digital audio/video signal quality.

59. The method of claim 58, further comprising:
generating said secondary signal to degrade signal quality.

60. The method of claim 59, wherein:
said step of generating said secondary signal generates a noise signal to degrade signal quality.

61. The method of claim 59, wherein:
said step of generating said secondary signal generates a content-based audio signal to degrade signal quality.

62. The method of claim 58, wherein:
said step of adding a secondary, signal to the digital audio/video signal selects a level of the added secondary signal determined by said level of content degradation to degrade signal quality.

* * * * *